US010444008B2

(12) United States Patent
Hagino et al.

(10) Patent No.: US 10,444,008 B2
(45) Date of Patent: *Oct. 15, 2019

(54) SPHERICAL SHAPE MEASUREMENT METHOD AND APPARATUS FOR ROTATING A SPHERE ABOUT FIRST ROTATION AXIS AND ROTATING A SPHERE HOLD MECHANISM ABOUT SECOND ROTATION AXIS ORTHOGONAL TO FIRST ROTATION AXIS

(71) Applicant: MITUTOYO CORPORATION, Kawasaki-shi, Kanagawa (JP)

(72) Inventors: Takeshi Hagino, Ibaraki (JP); Yuichiro Yokoyama, Ibaraki (JP); Yutaka Kuriyama, Ibaraki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 116 days.

This patent is subject to a terminal disclaimer.

(21) Appl. No.: 14/800,110

(22) Filed: Jul. 15, 2015

(65) Prior Publication Data
US 2016/0018215 A1    Jan. 21, 2016

(30) Foreign Application Priority Data

Jul. 17, 2014   (JP) ................. 2014-147226

(51) Int. Cl.
    *G01B 11/24*    (2006.01)
    *G01B 9/02*     (2006.01)
    *G01B 5/00*     (2006.01)

(52) U.S. Cl.
    CPC ........ *G01B 11/2441* (2013.01); *G01B 5/0004* (2013.01); *G01B 9/02039* (2013.01); *G01B 9/02041* (2013.01); *G01B 2210/52* (2013.01)

(58) Field of Classification Search
    CPC ............ G01B 11/2441; G01B 9/02039; G01B 5/0004; G01B 9/02041; G01B 2210/52
    See application file for complete search history.

(56) References Cited

U.S. PATENT DOCUMENTS

| 4,414,748 A | 11/1983 | Gauler et al. |
| 6,956,657 B2 | 10/2005 | Golini et al. |
| 9,347,771 B2 * | 5/2016 | Hagino .............. G01B 9/02039 |

FOREIGN PATENT DOCUMENTS

| CN | 201373721 | 12/2009 |
| CN | 103884270 | 6/2014 |

OTHER PUBLICATIONS

"Sphericity measurement using stitched interferometry", Mitutoyo Corporation, Yuichiro Yokoyama, Takeshi Hagino, Yutaka Kuriyarna, 2011, Discussed in specification, English abstract included.
(Continued)

*Primary Examiner* — Hwa Andrew Lee
(74) *Attorney, Agent, or Firm* — Rankin, Hill & Clark LLP

(57) ABSTRACT

In a spherical shape measurement method for measuring a surface shape, a sphere to be measured is made freely rotatable. The partial spherical shape of each measurement area, which is established so as to have an area overlapping with another measurement area adjacent to each other, is measured at each rotation position, and the surface shape is measured by joining the partial spherical shapes of the measurement areas by a stitching operation based on the shape of the overlapping area. In the state of detaching the sphere from the sphere hold mechanism to which the sphere is freely attachable and detachable, the sphere support table holds the sphere. The sphere is re-held at a different position, so that the shape of the entire sphere can be measured with high accuracy.

11 Claims, 11 Drawing Sheets

(56) References Cited

OTHER PUBLICATIONS

Chinese Office Action dated Aug. 16, 2018, English translation included, 18 pages.
Japanese Office Action dated May 15, 2018, English translation included, 9 pages.

* cited by examiner

SPHERICAL SHAPE MEASUREMENT METHOD AND APPARATUS FOR ROTATING A SPHERE ABOUT FIRST ROTATION AXIS AND ROTATING A SPHERE HOLD MECHANISM ABOUT SECOND ROTATION AXIS ORTHOGONAL TO FIRST ROTATION AXIS

The disclosure of Japanese Patent Application No. 2014-147226 filed on Jul. 17, 2014 including specifications, drawings and claims is incorporated herein by reference in its entirety.

TECHNICAL FIELD

The present invention relates to a spherical shape measurement method and apparatus, and in particular, to a spherical shape measurement method and apparatus that can measure the shape of an entire sphere (surface) with high accuracy.

BACKGROUND ART

Spherical parts or partly spherical parts, such as a ball of a bearing, a reference sphere used as a standard in a measurement device, and a lens are widely used in an industrial field. In order to measure the shapes of these spherical parts, a number of surface shape measurement methods and devices are proposed. An interferometer device, which is a representative example thereof, can measure the surface shapes of the spherical parts with high accuracy and high density. Furthermore, for the purpose of measuring the shape of a spherical surface that is out of a surface area measurable by the surface shape measurement device, U.S. Pat. No. 6,956,657 B2 (hereinafter called Patent Literature 1) and "sphericity measurement using stitched interferometry" proceedings of JSPE autumn meeting, 2011, p. 868-869 (hereinafter called Non-Patent Literature 1) propose an apparatus that includes surface shape measurement unit and measurement position change mechanism for holding the spherical surface and changing a measurement position.

In such an apparatus, while the measurement position change mechanism changes the measurement position by shifting the spherical surface, the surface shape measurement unit measures the shapes of a plurality of partial areas. By joining the measured shapes of the plurality of partial areas by a computation called stitching, the shape of the wide spherical surface is measured.

A summary of the spherical shape measurement apparatus described in Non-Patent Literature 1 will be explained. FIG. 1 is a side view showing the structure of the apparatus. The spherical shape measurement apparatus includes a part of a laser interferometer 20 being the surface shape measurement unit, for example, a Fizeau interferometer, and a part of a measurement position change mechanism 40 being the measurement position change mechanism. The laser interferometer 20 used in this apparatus is a device that measures the surface shape of a sphere 10 by using a reference spherical surface 22 having a spherical shape and comparing the wavelength of laser light 26 generated by a laser light source 24, which is used as a yardstick, with the reference spherical surface 22. In the drawings, a reference numeral 28 refers to a beam splitter. A reference numeral 30 refers to a collimator lens for making the laser light 26 into parallel rays. A reference numeral 32 refers to an image sensor for detecting interference light synthesized by the beam splitter 28.

The sphere 10 (hereinafter simply called sphere) is disposed in a focal point of the reference spherical surface 22. Since an area measured by the laser interferometer 20 is a part of the surface of the sphere 10 to which the laser light 26 is applied, it is required to provide unit for moving the position of the laser interferometer 20 itself or the sphere 10, for the purpose of measuring a wider area. The apparatus described in Non-Patent Literature 1, which measures the shape of a sphere having a shaft, such as the sphere 10 having a support shaft 12 fixed thereto, is provided with the measurement position change mechanism 40 for moving an arbitrary surface of the sphere 10 to a measurement area of the laser interferometer 20 by a biaxial rotation mechanism having a θ rotation shaft 42 and a φ rotation shaft 44 orthogonal to the θ rotation shaft 42, while holding the sphere 10 through the support shaft 12.

FIG. 2 is a top plan view of the apparatus according to Non-Patent Literature 1. The φ rotation shaft 44 is adjusted so as to form a right angle with a measurement optical axis (perpendicular direction in the drawing of FIG. 2) and coincide with the focal point of the reference spherical surface 22 positioned thereon. By rotating the φ rotation shaft 44, a bracket 46 for supporting the θ rotation shaft 42 is rotated about a φ axis. The θ rotation shaft 42 is rotatable thereon by 360 degrees or more. At this time, the length of the support shaft 12 and an arm of the bracket 46 is adjusted such that the center of the sphere 10 is positioned on the φ rotation shaft 44, whereby the sphere 10 can be rotated by an arbitrary angle at a focus position of the reference spherical surface 22. In this structure, to measure an area extending to a half of the sphere 10 by the laser interferometer 20, the sphere 10 is rotated about the θ rotation shaft 42 by 360 degrees and the φ rotation shaft 44 by 90 degrees from a position at which the support shaft 12 is orthogonal to the measurement optical axis to a position at which the support shaft 12 is parallel to the measurement optical axis.

FIGS. 3A and 3B show the relation among a measurable area by the apparatus with such a configuration, and the θ and φ rotation axes of the apparatus. In FIGS. 3A and 3B, the apparatus shown in FIG. 1 is viewed from above. First, the angle of the φ rotation shaft 44 at which the support shaft 12 is orthogonal to the measurement optical axis of the laser interferometer 20 is defined as a first support angle φ1. FIG. 3A shows this state. Defining a central axis of the support shaft 12 as a polar axis of the sphere 10, contours in the surface of the sphere 10 at positions orthogonal to the polar axis are considered as latitude lines of the sphere 10, and the contour having a maximum diameter is the equator (a first measurement latitude line). At the first support angle φ1, rotating the θ rotation shaft 42 directs an arbitrary point in the first measurement latitude line in the sphere 10 toward the laser interferometer 20. By performing measurement at the position, the shape of a single measurement area is measured at an arbitrary position of the θ rotation shaft 42. It is desirable that rotation intervals of the θ rotation shaft 42 be determined so as to have an overlapping area between the single measurement areas adjacent to each other, for the sake of a stitching operation performed afterward. This overlapping area may be approximately of the order of a half of a viewing angle of the laser interferometer 20, for example. Here, the first support angle φ1 is defined as a position at which the support shaft 12 is orthogonal to the measurement optical axis, but is not necessarily such a position and may be set at any arbitrary position.

Then, the φ rotation shaft 44 is rotated to set the support shaft 12 at a position different from the first support angle φ1. This position is referred to as a second support angle φ2.

FIG. 3B shows this state. By rotating the θ rotation shaft 42 at this position, points on the spherical surface intersecting with the measurement optical axis of the laser interferometer 20 draw a trail. A contour line represented by this trail is referred to as a second measurement latitude line. Just as with an operation at the first support angle ϕ1, rotating the θ rotation shaft 42 allows measurement of the shape of the single measurement area at an arbitrary position of the θ rotation shaft 42 in the second measurement latitude line in the spherical surface. Just as with the rotation intervals of the θ rotation shaft 42, the distance between the first support angle ϕ1 and the second support angle ϕ2 may be approximately of the order of a half of the viewing angle of the laser interferometer 20, for example. A plurality of support angles ϕ are set in a rotation range of the ϕ rotation shaft 44, and the θ rotation shaft 42 is operated at each position. This procedure is performed until the single measurement areas corresponding to the individual positions cover a hemispherical part of the sphere 10. The shapes of a number of the single measurement areas obtained in this manner are stitched together by the stitching operation with reference to positional information of the θ rotation shaft 42 and the ϕ rotation shaft 44, to measure the surface shape of the sphere 10. The rotation range of the ϕ rotation shaft 44 is not limited to 90 degrees as shown in FIG. 2, and can be set in an arbitrary range as long as there is no physical contact between the laser interferometer 20 and the measurement position change mechanism 40, or the like. A necessary prerequisite for the plurality of single measurement areas covering the half of the sphere 10 is a rotation range of 90 degrees of the ϕ rotation shaft 44.

When the measurement position change mechanism 40 has a dimensional error, that is, each constituting part has a dimension different from a design value, or a movement error, the sphere 10 may be displaced from the focus position of the reference spherical surface 22 with rotation of the θ rotation shaft 42 and the ϕ rotation shaft 44. In the interferometer device for measuring the spherical surface, this positional displacement causes a measurement error. Accordingly, the apparatus of Non-Patent Literature 1 may be provided with, for example, three axes movement mechanism 48 having stages 48x, 48y, and 48z, as shown in FIG. 4. This positional displacement can be corrected by moving the sphere 10 with reference to an interference fringe image of the laser interferometer 20 so as to minimize the number of interference fringes.

SUMMARY OF INVENTION

Technical Problem

The conventional techniques described in Patent Literature 1 and Non-Patent Literature 1 measure a partly spherical shape such as a lens or a sphere held by a fixed shaft. Thus, an area around the shaft and an area around a held portion are difficult to measure, and a measurement range of the conventional techniques is limited to approximately a half part of a sphere at the most. An area beyond the half part of the sphere can be measured, depending on the size of a field of view of the laser interferometer or a movement range of the measurement position change mechanism, but it is still impossible to measure the held portion of the sphere. Therefore, it is desirable to provide an apparatus and a measurement method for measuring the shape of the entire sphere with high accuracy.

The present invention has been made in order to solve the above-described problem in the conventional technique, and an object thereof is to measure the shape of an entire sphere with high accuracy.

Solution to Problem

To solve the above-described problem, a spherical shape measurement method according to the present invention for measuring a surface shape include: freely rotating a sphere to be measured; measuring a partial spherical shape of each measurement area, which is established so as to have an area overlapping with another measurement area adjacent to each other, at each rotation position; and joining the partial spherical shapes of the measurement areas by a stitching operation based on a shape of the overlapping area, thereby measuring the surface shape. The method further includes the step of enabling a sphere support table to hold the sphere in a state of detaching the sphere from a sphere hold mechanism to which the sphere is freely attachable and detachable, and the step of changing a position at which the sphere is held, so that the shape of the entire sphere can be measured.

The sphere support table may be rotatable.

The positions of the sphere and surface shape measurement unit may be adjustable.

The present invention provides a spherical shape measurement apparatus that includes surface shape measurement unit for measuring the partial shape of a spherical surface, and measurement position change mechanism for freely rotating a sphere to be measured relative to the surface shape measurement unit. The surface shape measurement unit measures the partial spherical shape of each measurement area, which is established so as to have an area overlapping with another measurement area adjacent to each other, at each rotation position, and the surface shape is measured by joining the partial spherical shapes of the measurement areas by a stitching operation based on the shape of the overlapping area. The spherical shape measurement apparatus further includes unit that has a sphere hold mechanism to which the sphere is freely attachable and detachable, and a sphere support table for holding the sphere detached from the sphere hold mechanism, and that changes a position at which the sphere is held, so that the shape of the entire sphere is measured.

The surface shape measurement unit may be a laser interferometer, and the measurement position change mechanism may rotate the sphere about a first rotation axis and a second rotation axis orthogonal to the first rotation axis.

The sphere support table may have a recess at a top surface thereof to receive and support the sphere detached from the sphere hold mechanism therein.

The spherical shape measurement apparatus may further include a mechanism for moving up and down the sphere support table.

The spherical shape measurement apparatus may further include a mechanism for retracting the sphere hold mechanism, while the sphere is detached.

The spherical shape measurement apparatus may further include a mechanism for rotating the sphere support table.

A rotation axis of the mechanism for rotating the sphere support table and the second rotation axis of the measurement position change mechanism may be coaxial with each other.

The spherical shape measurement apparatus may further include a movement mechanism in three axes directions to adjust the relative position between the sphere and the surface shape measurement unit.

Advantageous Effects of Invention

According to the present invention, it is possible to measure the shape of an entire sphere with high accuracy.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings.

Note that, the present invention is not limited to descriptions of the below embodiments and practical examples. Components of the below embodiments and practical examples include what is easily assumed by those skilled in the art, what is substantially the same, and what is in a so-called equivalent scope. Moreover, the components described in the below embodiments and practical examples may be appropriately combined or appropriately selectively used.

Figure 5:
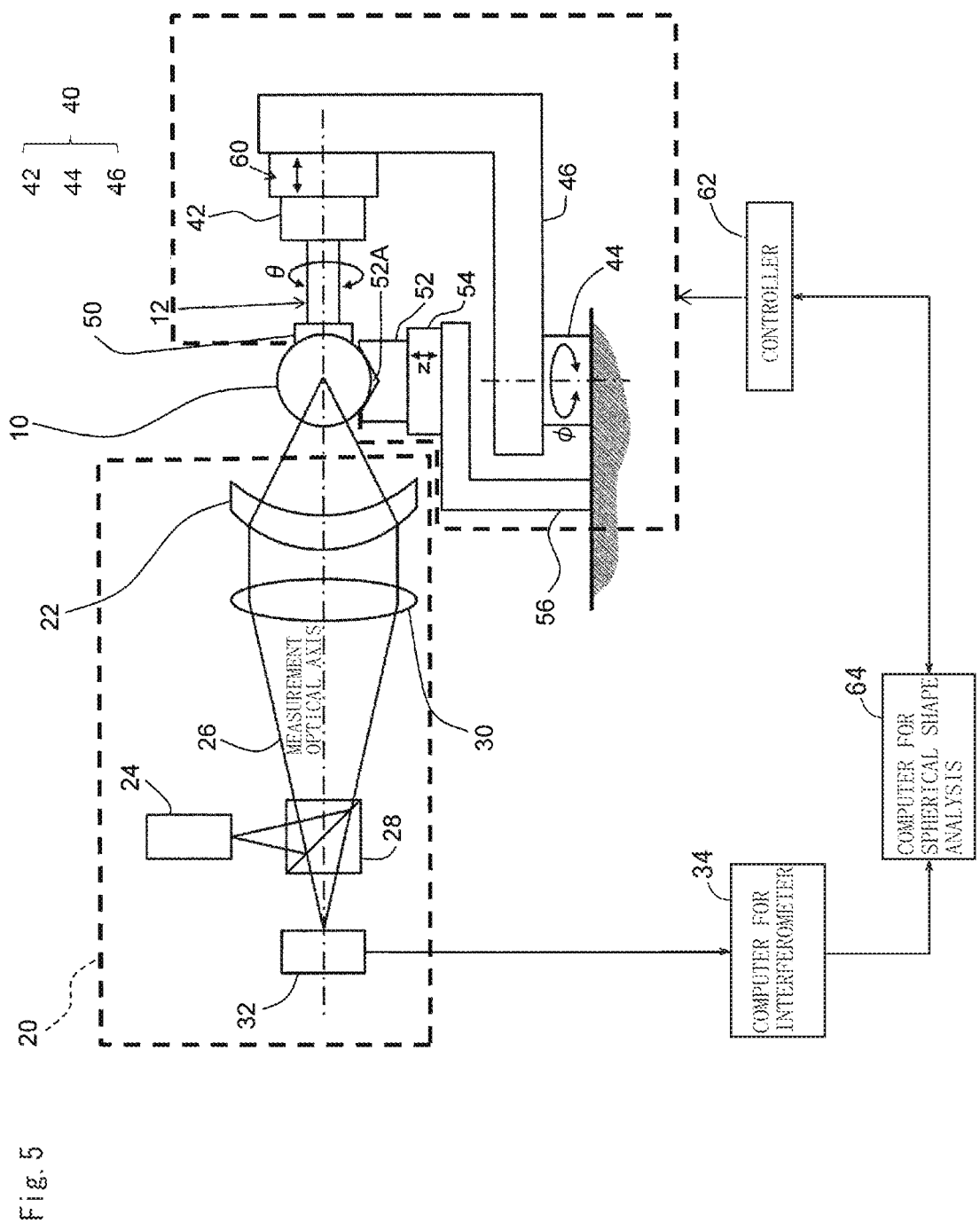
FIG. 5 is a side view illustrating a first embodiment of the present invention.

FIG. 5 shows the structure of a first embodiment of the present invention. In the first embodiment, a sphere hold mechanism 50, a sphere support table 52, a lift shaft 54 in Z direction, a base 56 for supporting the sphere support table 52 and the lift shaft 54 in Z direction, and an adjustment shaft 60 in R direction are newly added to the apparatus described in Non-Patent Literature 1, which includes the laser interferometer 20 and the measurement position change mechanism 40 having the θ rotation shaft 42, the φ rotation shaft 44, and the bracket 46, in order to enable measurement of the shape of an entire sphere by re-holding the sphere.

The sphere hold mechanism 50 has a mechanism to arbitrarily attach and detach the sphere 10 to and from the support shaft 12. By vacuum attraction, magnetic force in the case of a magnetized sphere, or the like, the sphere 10 can be freely attracted or detached.

The sphere support table 52 is a table having a recess 52A, in its top surface, to temporarily receive and support the sphere 10 detached from the sphere hold mechanism 50. While the sphere hold mechanism 50 is attracting the sphere 10, the sphere support table 52 is preferably retracted by the lift shaft 54 in Z direction so as not to contact the sphere 10. Also, while the sphere 10 is detached, the sphere hold mechanism 50 is preferably retracted by the adjustment shaft 60 in R direction so as not to contact the sphere 10.

Note that, the φ rotation shaft 44 is rotatable, for example, ±90 degrees=180 degrees, for the sake of re-holding the sphere 10.

In the drawing, a reference numeral 34 refers to a computer for the laser interferometer 20. A reference numeral 62 refers to a controller for controlling rotation of the θ rotation shaft 42 and the φ rotation shaft 44 of the measurement position change mechanism 40, attraction of the sphere hold mechanism 50, ascent and descent of the lift shaft 54 in Z direction, expansion and contraction of the adjustment shaft 60 in R direction, and the like. A reference numeral 64 refers to a computer for analyzing a spherical shape on the basis of information obtained by the computer 34, while controlling the measurement position change mechanism 40 and the re-holding of the sphere 10 through the controller 62.

Figure 6:
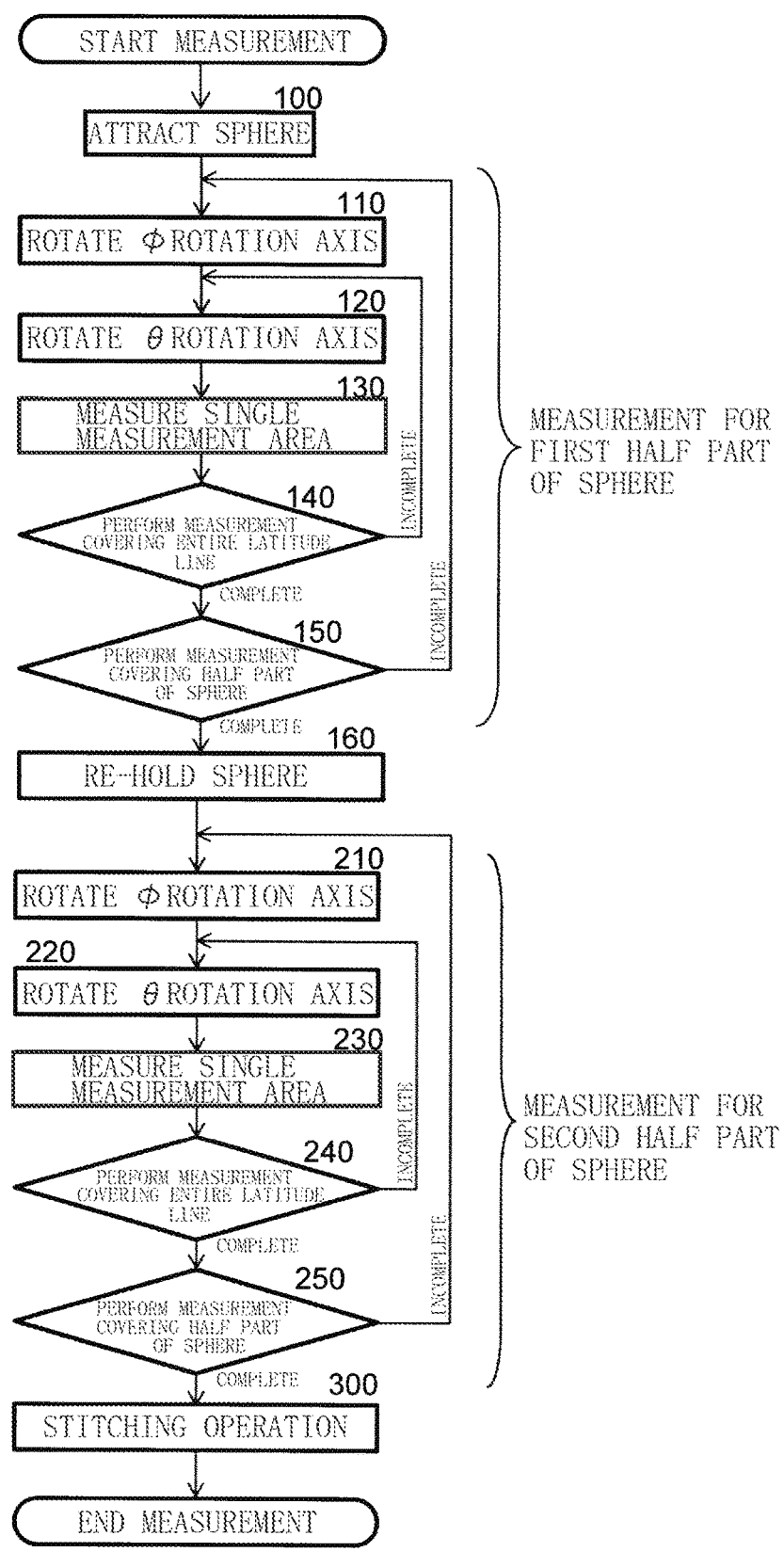
FIG. 6 is a flowchart of a procedure for measuring the shape of an entire sphere according to the first embodiment of the present invention.

A procedure for measurement of an entire sphere will hereinafter be described with reference to FIG. 6.

First, the sphere 10 is attracted to the sphere hold mechanism 50 in step 100. The φ rotation shaft 44 is rotated and set at a predetermined angle in step 110. Then, the rotation of the θ rotation shaft 42 in step 120 and the measurement of the single measurement area in step 130 are repeated, until it is judged in step 140 that measurement covering an entire predetermined latitude line has been performed.

Then, the φ rotation shaft 44 is rotated in step 110 to change the latitude line and a repetition of steps 120 to 140 is performed, until it is judged in step 150 that measurement covering a first half part of the sphere (surface) has been performed.

Figure 7:
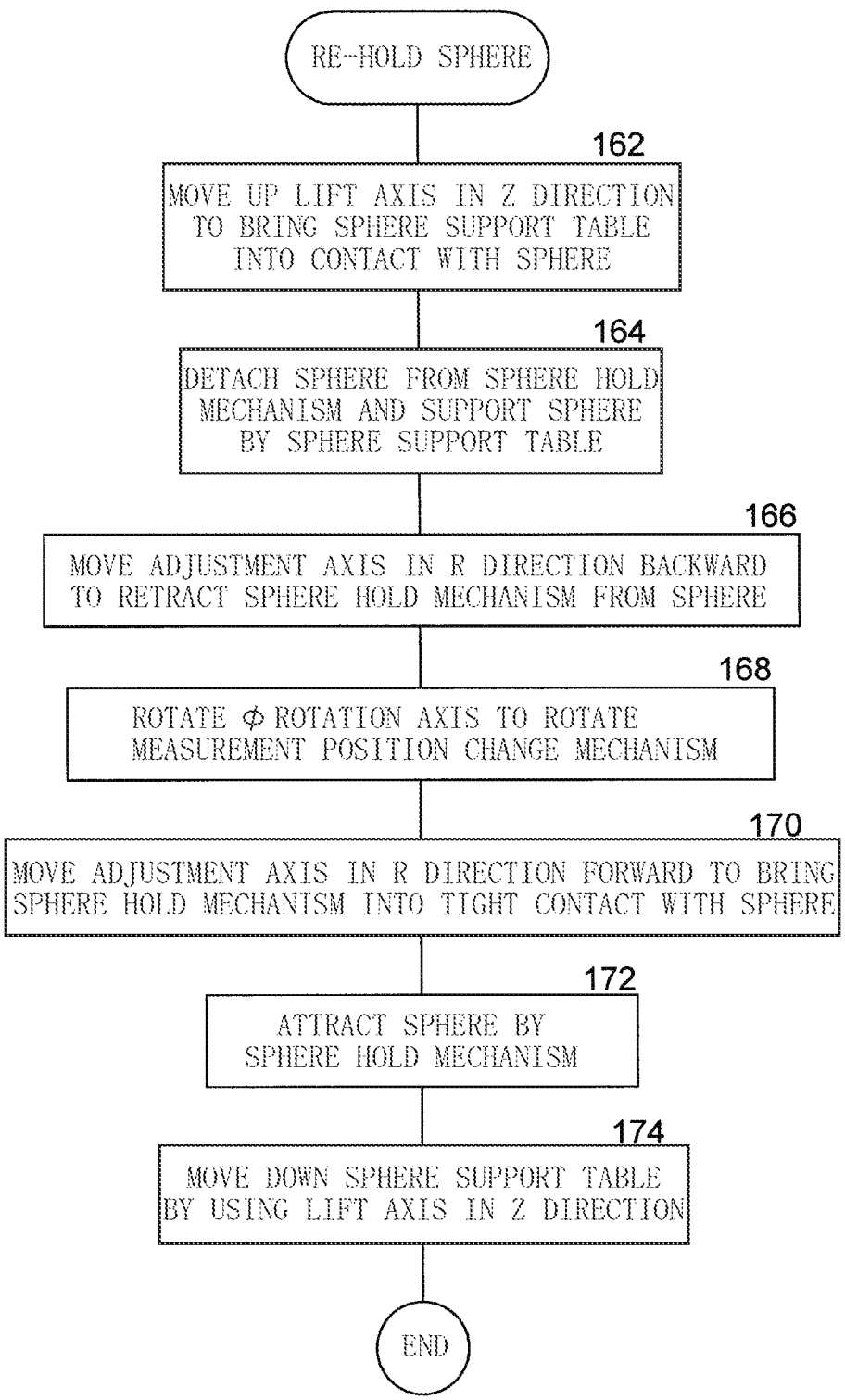
FIG. 7 is a flowchart of a procedure for re-holding the sphere according to the first embodiment of the present invention.

When it is judged that the measurement of the first half part of the sphere has been completed in step 150, the sphere 10 is re-held in step 160. More specifically, as shown in FIG. 7, the lift shaft 54 in Z direction is moved up while the sphere hold mechanism 50 is attracting the sphere 10, so that the sphere support table 52 comes into contact with the sphere 10 (step 162). Then, the sphere 10 is detached from the sphere hold mechanism 50, and supported by the sphere support table (step 164). Then, the sphere hold mechanism 50 is retracted (moved backward in a right direction of the drawing) by operation of the adjustment shaft 60 in R direction to keep the sphere hold mechanism 50 from contact with the sphere 10 (step 166). In this state, the measurement position change mechanism 40 can move to an arbitrary rotation position by the rotation of the φ rotation shaft 44 (step S168). After the rotation position is changed, the adjustment shaft 60 in R direction is operated (moved forward in a left direction of the drawing), so that the sphere hold mechanism 50 makes tight contact with the sphere 10 (step 170), and the sphere hold mechanism 50 attracts the sphere 10 again (step 172). After that, the lift shaft 54 in Z direction is operated to move down the sphere support table 52 (step 174).

Figure 2:
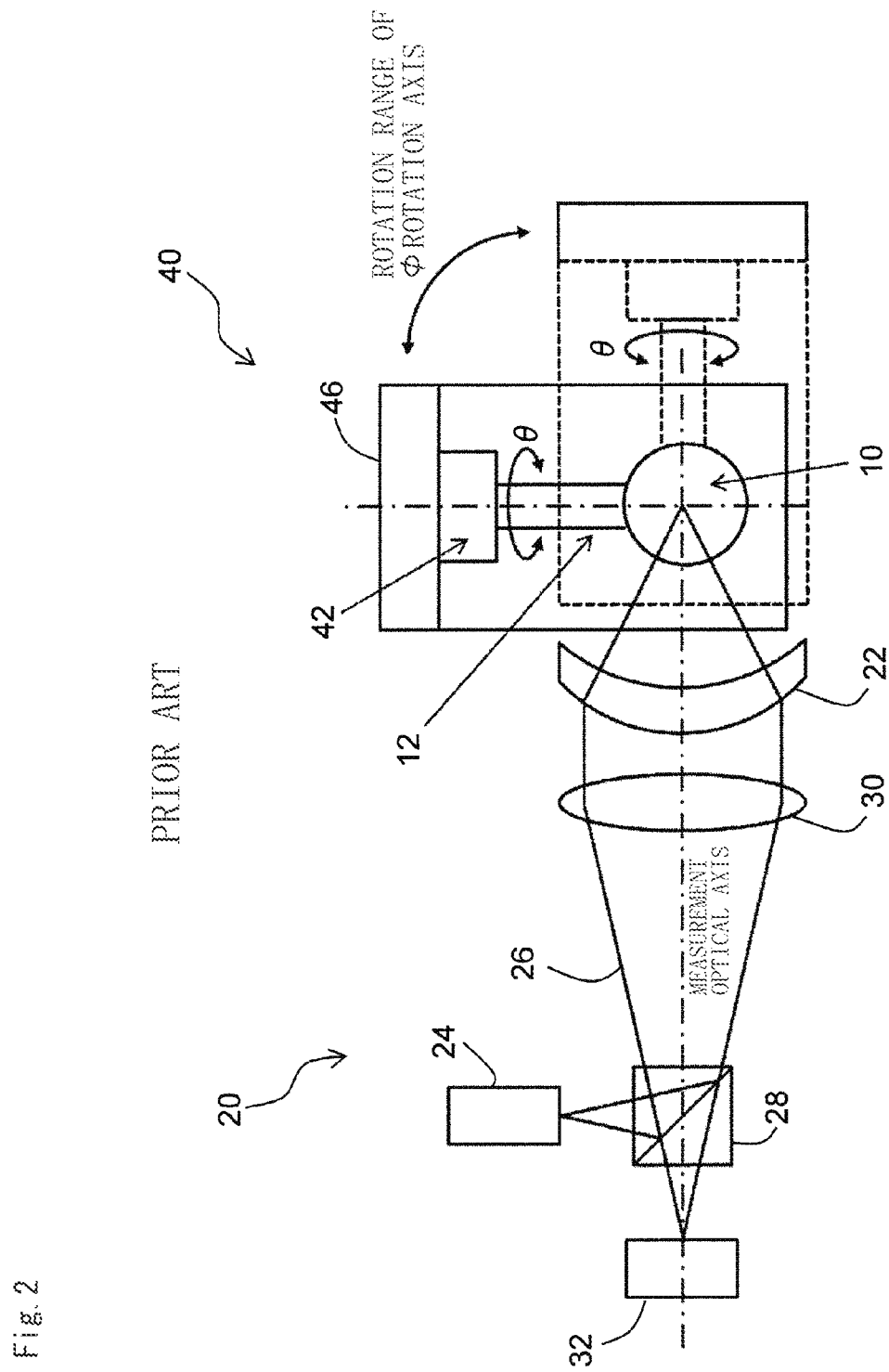
FIG. 2 is a plan view of the spherical shape measurement apparatus of FIG. 1.
Figure 3:
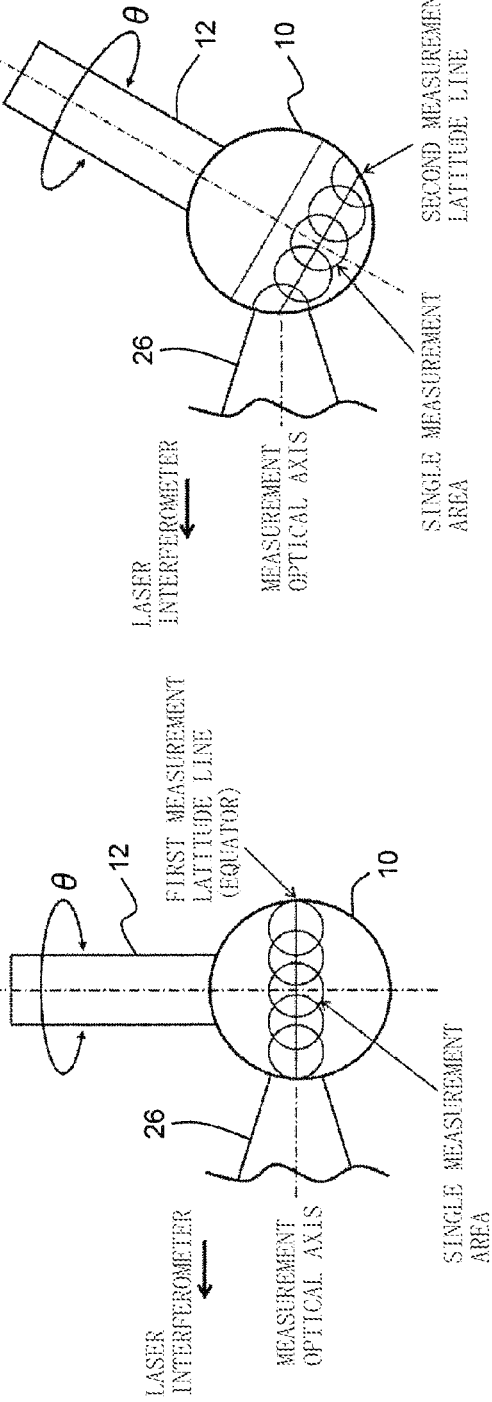
FIG. 3A and FIG. 3B are enlarged plan views for explaining a measurement procedure of the spherical shape measurement apparatus of FIG. 1.
Figure 4:
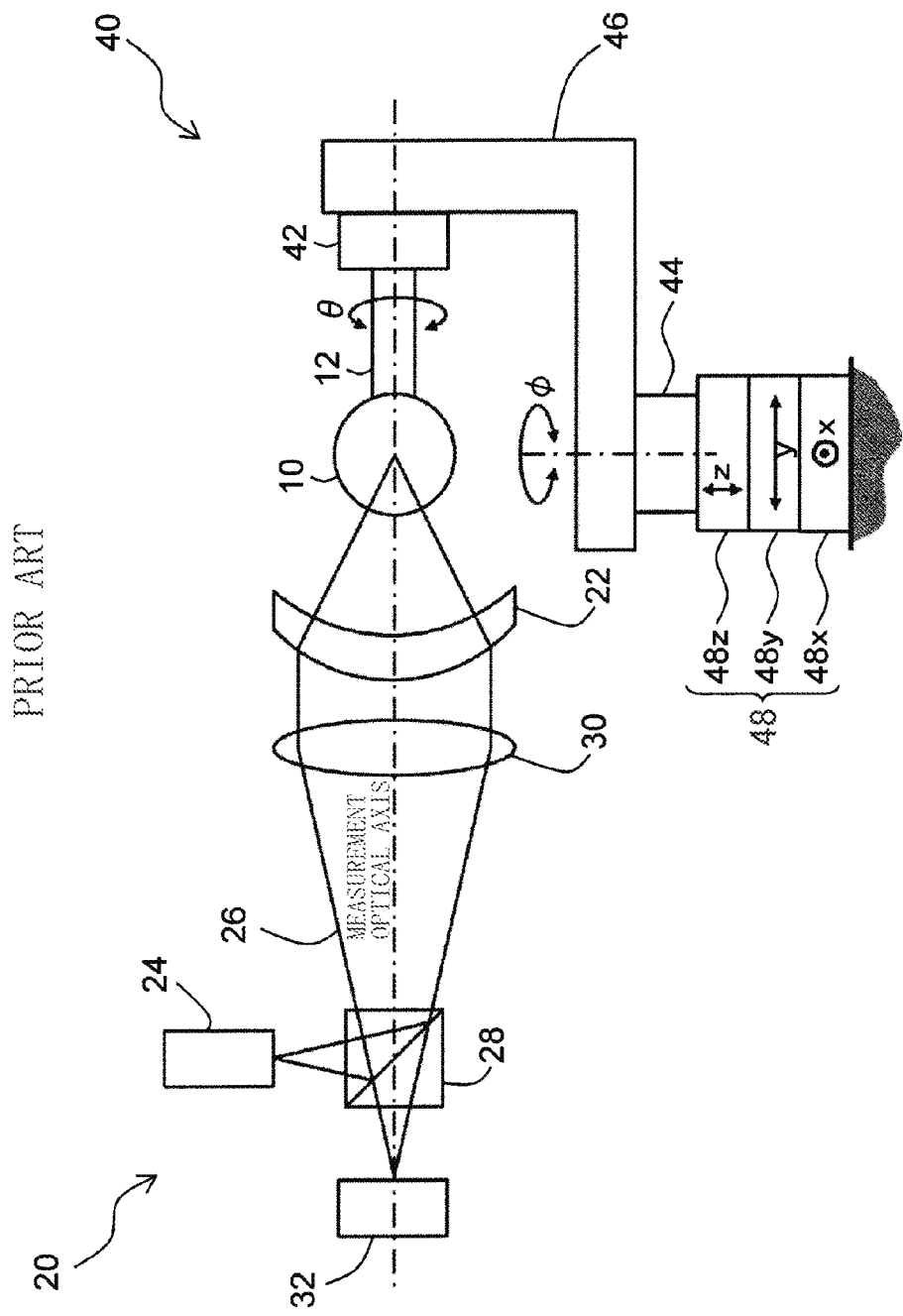
FIG. 4 is a side view of the spherical shape measurement apparatus of FIG. 1, having three axes movement mechanism.

This sequential operation changes the position of holding the sphere 10, and allows the re-holding of the sphere 10. To be more specific, by 180 degrees rotation of the φ rotation shaft 44 from a position shown in FIG. 2 at which the θ rotation shaft 42 is orthogonal to the measurement optical axis, the sphere 10 is re-held at a position inverted by 180 degrees.

After the re-holding, a second half part of the sphere (surface) is measured at steps 210 to 250, corresponding to steps 110 to 150. By doing so, measurement is performed in the state of directing a portion that the sphere has been held by and cannot be measured by the apparatus described in Non-Patent Literature 1 toward the laser interferometer 20, and it becomes possible to collect measurement results of the single measurement areas that cover the entire sphere. Provided that the first half part of the sphere is measured before the re-holding and the second half part of the sphere is measured after the re-holding, the shape of the entire sphere can be measured by the stitching operation of the two half parts of the sphere in step 300. An operation flow to measure each of the first and second half part of the sphere is the same as that of Non-Patent Literature 1. The sphere 10 is re-held between the measurement of the two half parts of the sphere, and the stitching operation is performed to join the two half parts of the sphere after the measurement.

The rotation range of the φ rotation shaft 44 in a re-holding operation of the sphere 10 is not limited to 180 degrees, and an arbitrary angle is adoptable. However, the most efficient way to measure the shape of the entire sphere is that the sphere 10 is re-held at a position of 180 degrees and measured half by half.

In this embodiment, the φ rotation shaft 44 is used for re-holding the sphere 10, resulting in simple structure.

Figure 1:
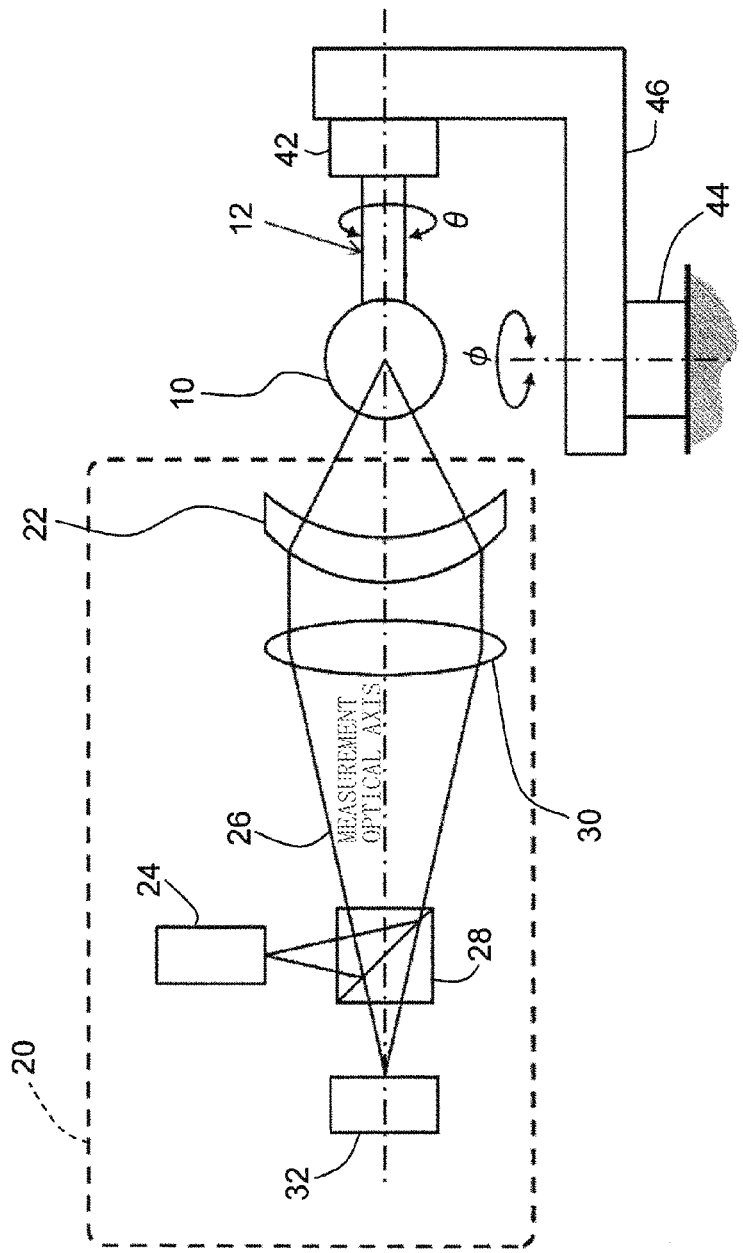
FIG. 1 is a side view illustrating a spherical shape measurement apparatus described in Non-Patent Literature 1.
Figure 8:
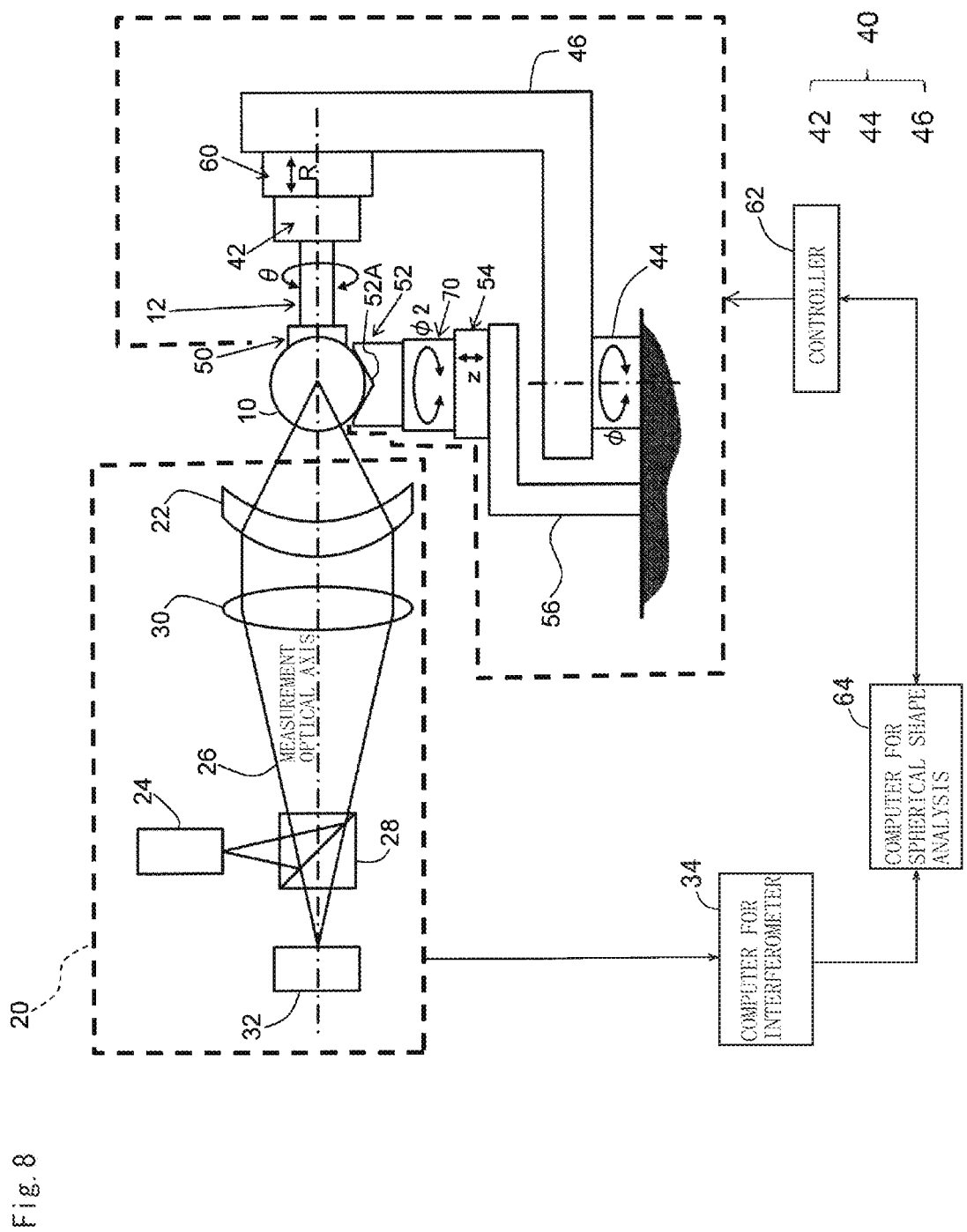
FIG. 8 is a side view illustrating a second embodiment of the present invention.

Next, FIG. 8 illustrates the structure of a second embodiment according to the present invention. In this embodiment, a φ2 rotation shaft 70 is further provided between the lift shaft 54 in Z direction and the sphere support table 52 of the apparatus according to the first embodiment, to make the sphere support table 52 rotatable. The φ2 rotation shaft 70 is coaxial with the φ rotation shaft 44. The rotation range of the φ rotation shaft 44 may be 0 degree to 90 degrees, just as with the conventional technique shown in FIG. 1. Note that, the position of providing the φ2 rotation shaft 70 is not limited to between the lift shaft 54 in Z direction and the sphere support table 52, and may be between the lift shaft 54 in Z direction and the base 56.

Since the other structure is the same as that of the first embodiment, the description thereof will be omitted.

In the measurement method according to the present invention, the position of the single measurement area in the spherical surface to be measured corresponds to the position of each of the θ rotation shaft 42 and the φ rotation shaft 44, in a procedure for measuring the half part of the sphere while the sphere 10 is being held. However, since the re-holding of the sphere 10 once separates the measurement position change mechanism 40 from the sphere 10, there is no continuity between before and after the re-holding in the position of the single measurement area on the spherical surface and the position of each of the θ rotation shaft 42 and the φ rotation shaft 44. For this reason, the sphere 10 has to be re-held with as much care as possible to prevent the occurrence of an error such as a positional displacement. According to the structure of the first embodiment, in a case where there is an eccentricity of the support shaft 12 or a mechanical error of the φ rotation shaft 44 owing to whirling or the like, the center of the rotation of the measurement position change mechanism 40 does not necessarily coincide with the center of the sphere 10, and hence an error owing to the re-holding possibly occurs.

In this embodiment, the re-holding operation of the sphere 10 is performed by rotating the sphere support table 52 about the φ2 rotation shaft 70, which is coaxial with the φ rotation shaft 44. Thereby, it is possible to stably re-hold the sphere 10, even if there is the eccentricity of the support shaft 12 or the whirling of the φ rotation shaft 44.

Figure 9:
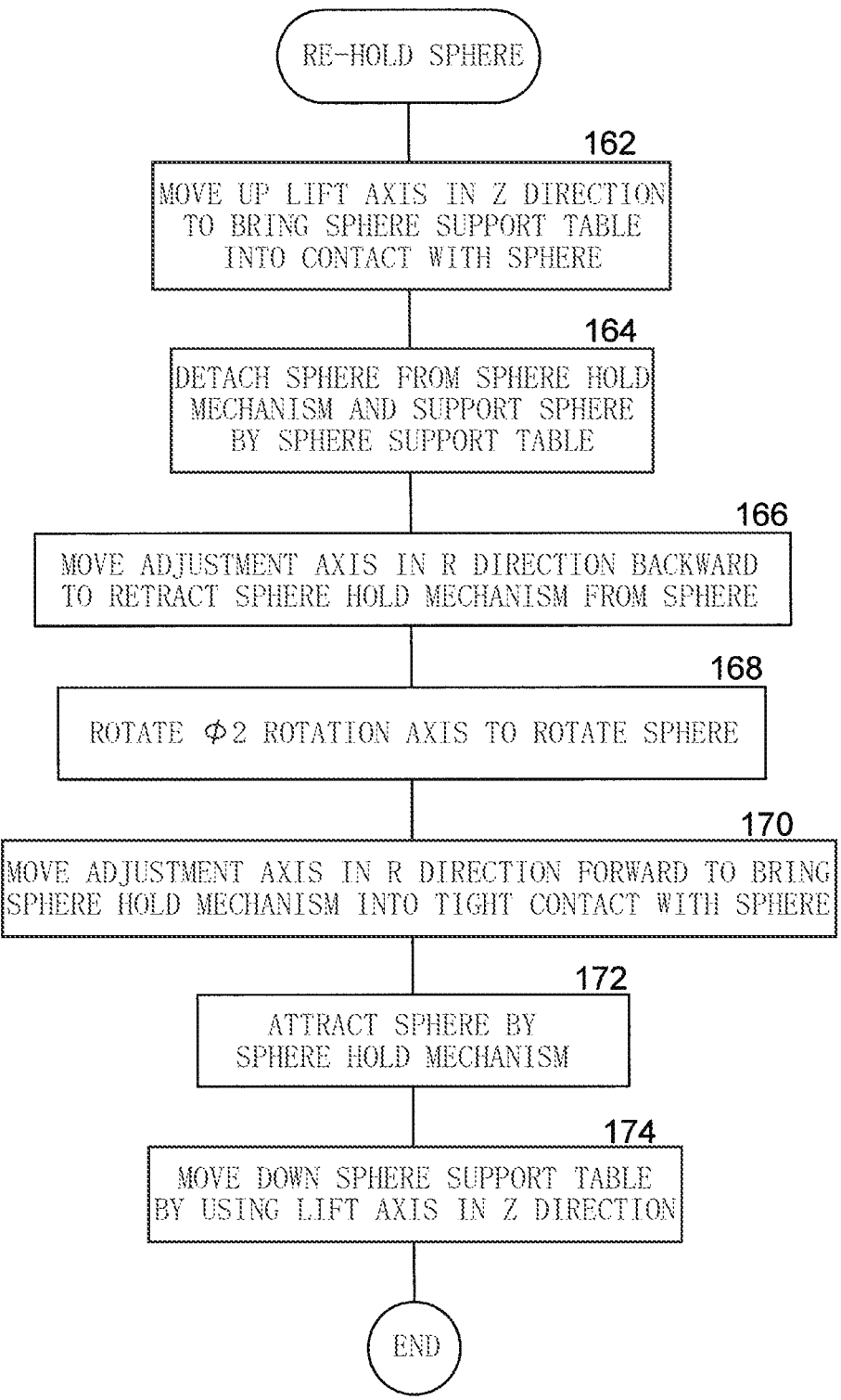
FIG. 9 is a flowchart of a procedure for re-holding the sphere according to the second embodiment of the present invention.

A procedure for re-holding the sphere according to the second embodiment of the present invention will be hereinafter described with reference to FIG. 9.

The lift shaft 54 in Z direction is moved up while the sphere hold mechanism 50 is attracting the sphere 10, such that the sphere support table 52 comes into contact with the sphere 10 (step 162). Then, the sphere 10 is detached from the sphere hold mechanism 50, and supported by the sphere support table 52 (step 164). Then, the sphere hold mechanism 50 is retracted (moved backward in a right direction of FIG. 8) by operation of the adjustment shaft 60 in R direction to keep the sphere hold mechanism 50 from being brought into contact with the sphere 10 (step 166). In this state, the φ2 rotation shaft 70, which is adjusted to be coaxial with the φ rotation shaft 44, is rotated to move the sphere 10 to an arbitrary rotation position relative to the measurement position change mechanism 40 (step 180). After the rotation position is changed, the adjustment shaft 60 in R direction is operated (moved forward in a left direction of FIG. 8) such that the sphere hold mechanism 50 makes tight contact with the sphere 10 (step 170), and the sphere hold mechanism 50 attracts the sphere 10 again (step 172). After that, the lift shaft 54 in Z direction is operated to move down the sphere support table 52 (step 174).

This sequential operation changes the position of holding the sphere 10, and allows the re-holding of the sphere 10. A procedure for measuring the spherical surface is the same as that of the first embodiment except for step 180 of the re-holding operation, and hence the description thereof will be omitted.

According to this embodiment, even if the measurement position change mechanism 40 has a movement error or the like, it is possible to precisely re-hold the sphere 10 and measure the shape of the entire sphere 10 with high accuracy. Also, the φ rotation shaft 44 is not used in the re-holding operation, and hence may have a rotation range of 0 degree to 90 degrees, just as with the conventional technique.

Figure 10:
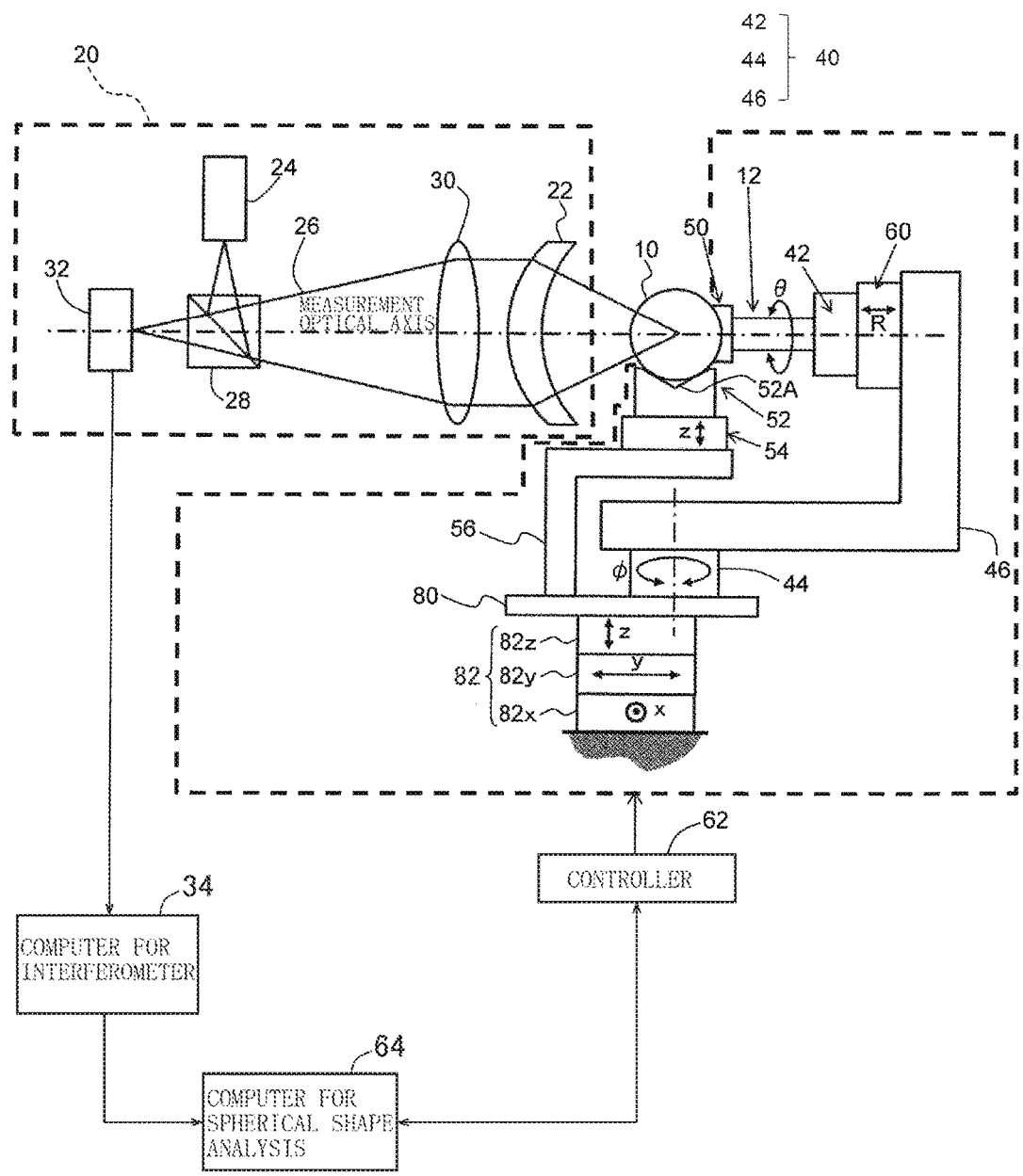
FIG. 10 is a side view illustrating a third embodiment of the present invention.

Next, FIG. 10 illustrates the structure of a third embodiment of the present invention. According to this embodiment, the apparatus of the first embodiment is additionally provided with a base 80 on which the φ rotation shaft 44 and the base 56 are mounted, and movement mechanism 82 for translationally moving the base 80 in three axes directions of x, y, and z. In the drawing, a reference numeral 82x refers to an x axial direction movement mechanism. A reference numeral 82y refers to a y axial direction movement mechanism. A reference numeral 82z refers to a z axial direction movement mechanism.

The other components are the same as those of the first embodiment, a description thereof will be omitted.

When there is a difference in dimension of each part constituting the measurement position change mechanism 40 from a design value or a movement error, the sphere 10 may be displaced from the center of surface shape measurement unit with the rotation of the θ rotation shaft 42 and the φ rotation shaft 44. This displacement sometimes causes a measurement error of the surface shape measurement unit. For example, when the laser interferometer 20 for measuring the spherical surface is used as the surface shape measurement unit, a displacement occurring between the sphere 10 and the center of the reference spherical surface 22 causes a measurement error. Accordingly, the three axes movement mechanism 82 is provided to correct this positional displacement. When the laser interferometer 20 is used as the surface shape measurement unit, this positional displacement can be corrected by moving the sphere 10 with reference to an interference fringe image so as to minimize the number of interference fringes.

According to this embodiment, it is possible to reduce an effect of the measurement error that is associated with the positional displacement between the sphere 10 and the surface shape measurement unit owing to the movement error of the measurement position change mechanism 40 or the difference in dimension of the component from the design value, and therefore measure the shape of the entire sphere with high accuracy.

Figure 11:
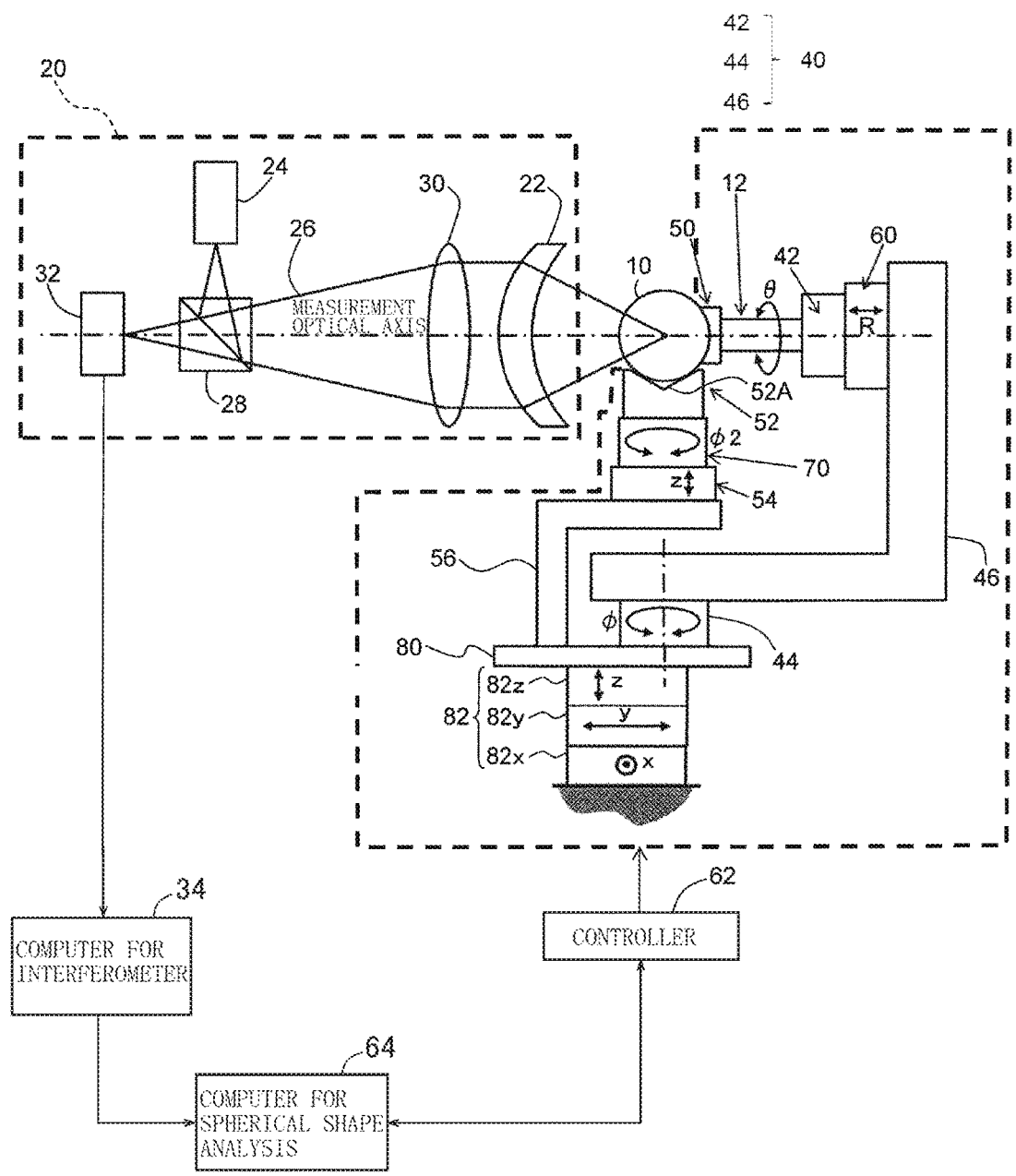
FIG. 11 is a side view illustrating a fourth embodiment of the present invention.

Next, FIG. 11 illustrates the structure of a fourth embodiment in which the three axes movement mechanism 82 described in the third embodiment is added to the apparatus of the second embodiment.

The other structure and effects are the same as those of the first to third embodiments, so a description thereof will be omitted.

According to this embodiment, it is possible to precisely re-hold the sphere 10 even with a movement error of the measurement position change mechanism 40 or the like, and reduce an effect of the measurement error that is associated with a positional displacement between the sphere 10 and the surface shape measurement unit owing to a movement error of the measurement position change mechanism 40 or a difference in dimension of components from a design value. Therefore, it becomes possible to measure the shape of the entire sphere 10 with high accuracy.

The structures of the apparatuses described above are just examples, and other structures are adoptable so long as the apparatus can operate equivalently. For example, the position of the lift shaft 54 in Z direction and the φ2 rotation shaft 70 according to the fourth embodiment may be changed, and the lift shaft 54 in Z direction may be provided on the φ2 rotation shaft 70. Like this example, order of configuration of the axes and the like are flexibly changeable so long as the entire apparatus can operate equivalently. Moreover, the positional relation between the θ rotation shaft 42 and the φ rotation shaft 44 is not necessarily orthogonal, and is changeable so long as the θ rotation shaft 42 and the φ rotation shaft 44 can operate equivalently.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. A spherical shape measurement method for measuring a surface shape of a sphere consisting of a first half part and a second half part, the surface shape having a plurality of measurement areas which is established so as to have an area overlapping with another measurement area adjacent to each other, at each rotation position, the method comprising:
   1) rotating the sphere about a first rotation axis and measuring one of the plurality of measurement areas of the first half part in a state that a portion of the second half part of the sphere is attached to a sphere hold mechanism;
   2) rotating the sphere hold mechanism about a second rotation axis which is orthogonal to the first rotation axis without detaching the portion of the second half part from the sphere hold mechanism to change the measurement area of the first half part;
   3) repeating the steps 1 and 2 without detaching the portion of the second half part from the sphere hold mechanism until a measurement covering an entirety of the first half part is performed;
   4) detaching the sphere from the sphere hold mechanism in a state that the sphere is held by a sphere support table;
   5) rotating the sphere hold mechanism about the second rotation axis which is orthogonal to the first rotation axis, in a state that the sphere is held by the sphere support table and the sphere is detached from the sphere hold mechanism, to change a position at which the sphere is held from the portion of the second half part to a portion of the first half part, so that the surface shape of the entire sphere can be measured;
   6) attaching the sphere hold mechanism to the portion of the first half part;
   7) rotating the sphere about the first rotation axis and measuring one of the plurality of measurement areas of the second half part in a state that the portion of the first half part of the sphere is attached to the sphere hold mechanism;
   8) rotating the sphere hold mechanism about the second rotation axis without detaching the portion of the first half part from the sphere hold mechanism to change the measurement area of the second half part;
   9) repeating the steps 7 and 8 without detaching the portion of the first half part from the sphere hold mechanism until a measurement covering an entirety of the second half part is performed; and
   10) joining results of the steps 3 and 9 by a stitching operation based on a shape of the overlapping area, thereby measuring the surface shape of the entire sphere.

2. The spherical shape measurement method according to claim 1, wherein the sphere support table is rotatable.

3. The spherical shape measurement method according to claim 1, wherein positions of the sphere and surface shape measurement unit are adjustable.

4. A spherical shape measurement apparatus for measuring a surface shape of a sphere consisting of a first half part and a second half part, the surface shape having a plurality of measurement areas, comprising:
   a surface shape measurement unit for measuring a partial shape of a spherical surface;
   a sphere hold mechanism to which the sphere to be measured is attachable and detachable;
   a sphere support table for holding the sphere detached from the sphere hold mechanism;
   first means for rotating the sphere about a rotation center line of the first means for rotating in a state that the sphere is attached to the sphere hold mechanism;
   second means for rotating the sphere hold mechanism about a rotation center line of the second means for rotating in a state that the sphere is held by the sphere support table and the sphere is detached from the sphere hold mechanism, the rotation center line of the second means for rotating being orthogonal to the rotation center line of the first means for rotating;

a bracket connecting the first means for rotating and the second means for rotating; and a controller for controlling the first means for rotating and the second means for rotating, the surface shape measurement unit measuring a partial surface shape of each measurement area of the sphere, which is established so as to have an area overlapping with another measurement area adjacent to each other, at each rotation position, the surface shape being measured by joining the partial spherical shapes of the measurement areas by a stitching operation based on a shape of an overlapping area, wherein the surface shape measurement unit is capable of measuring the partial shape of the spherical surface in a state that the sphere is attached to the sphere hold mechanism, the sphere support table has a recess at a top surface thereof to receive and support the sphere detached from the sphere hold mechanism therein, and the controller controls the first means for rotating and the second means for rotating to perform:

1) a rotation of the sphere about the rotation center line of the first means for rotating and a measurement of one of the plurality of measurement areas of the first half part in a state that a portion of the second half part of the sphere is attached to the sphere hold mechanism;

2) a rotation of the sphere hold mechanism about the rotation center line of the second means for rotating without detaching the portion of the second half part from the sphere hold mechanism to change the measurement area of the first half part;

3) a repeat of the steps 1 and 2 without detaching the portion of the second half part from the sphere hold mechanism until a measurement covering an entirety of the first half part is performed;

4) a detachment of the sphere from the sphere hold mechanism in a state that the sphere is held by the sphere support table;

5) a rotation of the sphere hold mechanism about the rotation center line of the second means for rotating in a state that the sphere is held by the sphere support table and the sphere is detached from the sphere hold mechanism, to change a position at which the sphere is held from the portion of the second half part to a portion of the first half part, so that the surface shape of the entire sphere can be measured;

6) an attachment of the sphere hold mechanism to the portion of the first half part;

7) a rotation of the sphere about the rotation center line of the first means for rotating and a measurement of one of the plurality of measurement areas of the second half part in a state that the portion of the first half part of the sphere is attached to the sphere hold mechanism;

8) a rotation of the sphere hold mechanism about the rotation center line of the second means for rotating without detaching the portion of the first half part from the sphere hold mechanism to change the measurement area of the second half part; and 9) a repeat of the steps 7 and 8 without detaching the portion of the first half part from the sphere hold mechanism until a measurement covering an entirety of the second half part is performed.

5. The spherical shape measurement apparatus according to claim 4, wherein the surface shape measurement unit is a laser interferometer.

6. The spherical shape measurement apparatus according to claim 4, further comprising a mechanism for moving up and down the sphere support table.

7. The spherical shape measurement apparatus according to claim 4, further comprising a mechanism for retracting the sphere hold mechanism, while the sphere is detached.

8. The spherical shape measurement apparatus according to claim 4, further comprising a mechanism for rotating the sphere support table.

9. The spherical shape measurement apparatus according to claim 8, wherein a rotation axis of the mechanism for rotating the sphere support table and the rotation center line of the second means for rotating are coaxial with each other.

10. The spherical shape measurement apparatus according to claim 4, further comprising a movement mechanism in three axes directions to adjust a relative position between the sphere and the surface shape measurement unit.

11. A spherical shape measurement method for measuring a surface shape of a sphere consisting of a first half part and a second half part, the surface shape having a plurality of measurement areas which is established so as to have an area overlapping with another measurement area adjacent to each other, at each rotation position, the method comprising:

1) rotating the sphere about a first rotation axis and measuring one of the plurality of measurement areas of the first half part in a state that a portion of the second half part of the sphere is attached to a sphere hold mechanism;

2) rotating the sphere hold mechanism about a second rotation axis which is orthogonal to the first rotation axis without detaching the portion of the second half part from the sphere hold mechanism to change the measurement area of the first half part;

3) repeating the steps 1 and 2 without detaching the portion of the second half part from the sphere hold mechanism until a measurement covering an entirety of the first half part is performed;

4) detaching the sphere from the sphere hold mechanism in a state that the sphere is held by a sphere support table;

5) rotating the sphere support table about a third rotation axis which is orthogonal to the first rotation axis and coaxial with the second rotation axis, in a state that the sphere is held by the sphere support table and the sphere is detached from the sphere hold mechanism, to change a position at which the sphere is held from the portion of the second half part to a portion of the first half part, so that the surface shape of the entire sphere can be measured;

6) attaching the sphere hold mechanism to the portion of the first half part;

7) rotating the sphere about the first rotation axis and measuring one of the plurality of measurement areas of the second half part in a state that the portion of the first half part of the sphere is attached to the sphere hold mechanism;

8) rotating the sphere hold mechanism about the second rotation axis without detaching the portion of the first half part from the sphere hold mechanism to change the measurement area of the second half part;

9) repeating the steps 7 and 8 without detaching the portion of the first half part from the sphere hold mechanism until a measurement covering an entirety of the second half part is performed; and 10) joining results of the steps 3 and 9 by a stitching operation based on a shape of the overlapping area, thereby measuring the surface shape of the entire sphere.

\* \* \* \* \*